(12) United States Patent
Sharp et al.

(10) Patent No.: US 6,294,362 B1
(45) Date of Patent: Sep. 25, 2001

(54) RAPID FERROUS SULFATE BIOOXIDATION

(75) Inventors: James E. Sharp; Kevin Stuffle, both of Tucson, AZ (US)

(73) Assignee: MBX Systems, Inc., Tucson, AZ (US)

( * ) Notice: Subject to any disclaimer, the term of this patent is extended or adjusted under 35 U.S.C. 154(b) by 0 days.

(21) Appl. No.: 08/943,172

(22) Filed: Oct. 3, 1997

Related U.S. Application Data

(60) Provisional application No. 60/026,660, filed on Oct. 4, 1996, and provisional application No. 60/038,660, filed on Feb. 21, 1997.

(51) Int. Cl.[7] .......................... C12N 11/00; C12N 11/16; C12P 1/04; C12P 3/00
(52) U.S. Cl. .......................... 435/174; 435/168; 435/170; 435/176; 435/180; 435/283.1; 435/289.1; 435/822
(58) Field of Search ..................................... 435/168, 170, 435/176, 180, 328.1, 289.1, 822

(56) References Cited

U.S. PATENT DOCUMENTS

| | | | | |
|---|---|---|---|---|
| 5,246,486 | * | 9/1993 | Brierley et al. | 75/743 |
| 5,766,930 | * | 6/1998 | Kohr | 435/262.5 |
| 5,914,441 | * | 6/1999 | Hunter et al. | 75/712 |

OTHER PUBLICATIONS

Johnson, A.M., D.H. Carlson, S.T. Bagley, D.L. Johnson (1988) "Investigations related to in situ bioleaching of Michigan chalcocite ores" Mining Engineering, Dec., pp. 1119–1122.

Rawlings, Douglas E., Simon Silver (1995) "Mining with Microbes" Biotechnology 13:773–778.

\* cited by examiner

*Primary Examiner*—Deborah K. Ware
(74) *Attorney, Agent, or Firm*—Saliwanchik, Lloyd & Saliwanchik

(57) ABSTRACT

Disclosed is an improved process for using iron-oxidizing bacteria to reactivate the raffinate ferrous sulfate solution in chemical leach operations. The process uses a biological raffinate converter, or BRC, as a key feature of the process. The process provides enhanced efficiency and commercial utility over the best known biological process for converting raffinate ferrous sulfate. The resulting ferric sulfate then can be recycled back into the bioleaching process of, for example, copper from chalcocite.

16 Claims, 5 Drawing Sheets

Raffinate Conversion Work Sheet

Experiment ID: 06116CC1 - Synthetic Raff. Conversion
Raffinate: DW (pH 2.0 DW)                    Pump: sump pump
  Volume(l): 4                                Flow rate(l/h): 60
  Additions: 80g FeSO4                        Bacteria: MGPV
Column: Drip Through                          Ball Type: M2
  Diameter (in): 6                            # of 1" Balls: 650
  Height (in): 24                             Loading: MGPV in 64
  Liquid input: 2 misters                     Gas: none
  System Circulation: open                    Location:
                                              Rate:

| Time (hr) | Sample ID | pH | Eh (mV) | Ferrous(g/l) | T.Fe (g/l) | % Ferric | % Ferrous | Conversion Rate(g/l/h) |
|---|---|---|---|---|---|---|---|---|
| 0 | 1 | 2.03 | 348 | 1.972 | 1.9 | 0.0% | 100.0% |  |
| 0.07 | 2 | 2.03 | 431 | 1.757 | 1.9 | 7.5% | 92.5% | 3.070 |
| 0.14 | 3 | 2.07 | 438 | 1.548 | 1.9 | 18.5% | 81.5% | 3.027 |
| 0.21 | 4 | 2.09 | 443 | 1.703 | 1.9 | 10.4% | 89.6% | 1.281 |
| 0.28 | 5 | 2.05 | 446 | 1.486 | 1.9 | 21.8% | 78.2% | 1.737 |
| 0.35 | 6 | 2.07 | 448 | 1.360 | 1.9 | 28.4% | 71.6% | 1.749 |
| 0.42 | 7 | 2.10 | 450 | 1.322 | 1.9 | 30.4% | 69.6% | 1.547 |
| 0.49 | 8 | 2.12 | 451 | 1.270 | 1.9 | 33.1% | 66.9% | 1.432 |
| 0.56 | 9 | 2.13 | 452 | 1.278 | 1.9 | 32.7% | 67.3% | 1.239 |
| 0.63 | 10 | 2.15 | 453 | 1.233 | 1.9 | 35.1% | 64.9% | 1.174 |

FIG. 2

RAPID FERROUS SULFATE BIOOXIDATION

The present application claims the priority of co-pending U.S. Provisional Patent Application Ser. No. 60/026,660, filed Oct. 4, 1996, and also claims the priority of co-pending U.S. provisional Patent Application Ser. No. 60/038,660, filed Feb. 21, 1997.

BACKGROUND OF THE INVENTION

Microorganisms play an important role in the mining industry where they are now used in the bioleaching recovery of copper, uranium, and gold (see Rawlings, D. E., S. Silver [1995] "Mining With Microbes," *Biotechnology* 13(August):773–778). Until now, microorganisms have not been used in conjunction with commercial chemical leach processes.

Copper sulfide ($Cu_2S$) is an acid soluble metal sulfide that is a component in the mineral known as chalcocite. Currently in the mining industry, a solution of ferric sulfate ($Fe_2(SO_4)_3$) is used to solubilize the copper from chalcocite by producing soluble copper sulfate ($CuSO_4$), along with insoluble elemental sulfur (S) and soluble ferrous sulfate ($FeSO_4$). The reactions involved, in summary form, are:

$$Cu_2S + Fe_2(SO_4)_3 \rightarrow CuS + CuSO_4 + 2FeSO_4$$

$$CuS + Fe_2(SO_4)_3 \rightarrow CuSO_4 + S + 2FeSO_4$$

The stripped leach solution, or raffinate, from this process contains ferrous sulfate ($FeSO_4$). Ferrous sulfate is a product having little value or utility and is often a waste product from the leaching process. A means to rapidly convert the ferrous sulfate waste back to ferric sulfate would enhance the efficiency of the chemical leaching process as well as providing an environmentally beneficial effect.

Johnson et al. ([1988] *Mining Engineering* December:1119–1122) describe a microbial process by which the conversion of ferrous sulfate to ferric sulfate can be accomplished. In the biological process, ferrous sulfate ($FeSO_4$) is acidified with sulfuric acid ($H_2SO_4$). Then, in the presence of oxygen ($O_2$) and carbon dioxide ($CO_2$), iron-oxidizing bacteria restore the iron sulfate to its oxidized ferric sulfate form. The reactions, in summary form, are:

$$4FeSO_4 + 2H_2SO_4 + O_2 \xrightarrow[\text{iron-oxidizing bacteria}]{CO_2} 2Fe_2(SO_4)_3 + 2H_2O$$

$$2S + 3O_2 \rightarrow 2H_2SO_4$$

BRIEF SUMMARY OF THE INVENTION

The subject invention concerns a unique system, including equipment and an improved process, for using bacteria to oxidize a metal cation. In a preferred embodiment, the system of the subject invention is used to reactivate raffinate to a high ferric sulfate solution in chemical leach operations. In this embodiment, the system of the subject invention is termed a "biological raffinate converter," BRC. The structure and operation of the BRC, which comprises a passive bioreactor trickle filter, which does not require any moving parts or gas injection systems, are disclosed below.

The BRC of the subject invention is a distinct improvement over the Johnson et al., supra, process in that the invention process provides enhanced efficiency and commercial utility.

In a particular embodiment, the system of the subject invention utilizes a trickle bed reactor for the conversion of ferrous ions to ferric ions. This reactor can utilize oxidizing bacteria that reside in the reactor bed and are attached to a packing medium within the trickle bed. In a preferred embodiment, the packing medium is a high surface area material. This medium can be, for example, ring and pin configuration polyethylene balls. In a specific embodiment, the packing medium is coated with a substrate to which bacteria can attach and propagate. Advantageously, this substrate can provide an energy source for the attached bacteria. Substrates which can be used according to the subject invention include graphite and sulfide concentrates, such as pyrite. The substrate may be attached to the packing material by an appropriate bonding agent such as polyethylmethacrylate or paraffin. In one embodiment, the substrate can support the growth of fungi. In this embodiment, inoculation of the packing medium with acidophilic fungi advantageously provides carbon dioxide as a carbon source for oxidizing bacteria.

The system of the subject invention may consist of a single reaction chamber or cell, or it may consist of multiple cells connected in series. When multiple cells are utilized, venting may be provided between the cells.

The components of a preferred embodiment of the BRC of the subject invention comprise (1) a column through which raffinate is passed by gravity flow, (2) a high surface area substrate, e.g, one-inch to one and a half-inch "BIOBALLS," coated with a bio-catalyst, which are loaded into the column. "BIOBALLS" are preferably polypropylene, but can be other appropriate polymeric material. The bio-catalyst can be coated onto the surface of the "BIOBALLS" by use of an adhesive medium, e.g., paraffin. The bio-catalyst-coated "BIOBALLS" can serve as a substrate for the growth of fungi and iron-oxidizing bacteria which synergistically provide the oxidizing environment for oxidizing (converting) ferrous ion content to a higher percentage ferric ion content in the raffinate. The synergistic relationship of the fungi and the iron-oxidizing bacteria involves the production by the fungi of carbon dioxide, a carbon source for the bacteria which oxidize the ferrous ion.

The application flow rate of the raffinate through the trickle filter of the subject invention can be, for example, about 60 liters/hour, with the conversion being 3.0 grams per liter per hour. See FIGS. 2 and 3.

BRIEF DESCRIPTION OF THE DRAWINGS

FIG. 2 shows a raffinate conversion worksheet of a typical operational run of a BRC of the subject system.

DETAILED DISCLOSURE OF THE INVENTION

Figure 1:
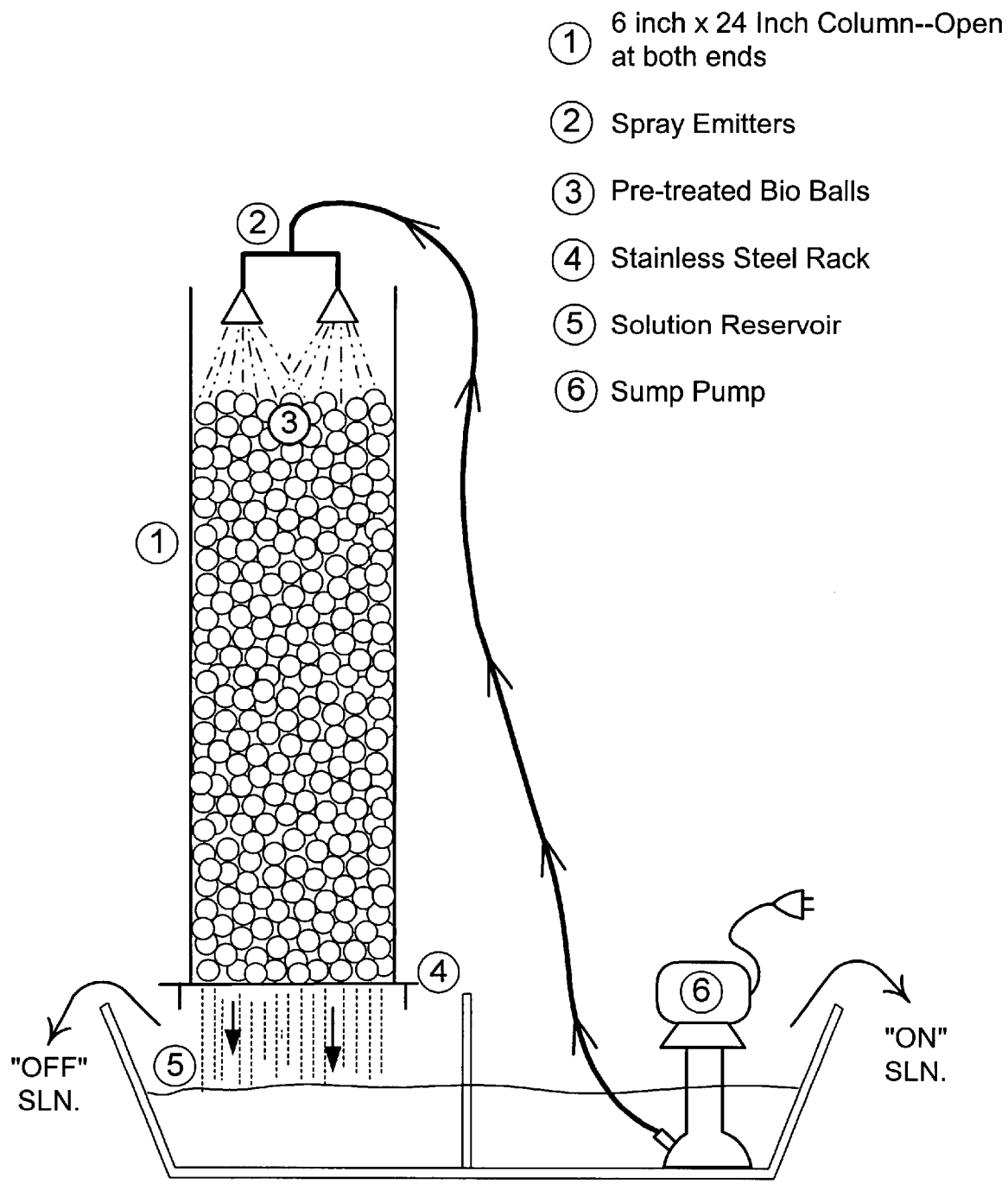
FIG. 1 shows a trickle filter according to the subject invention.

The subject invention pertains to systems for the efficient biological oxidation of metal cations. In a preferred embodiment, the subject invention relates to the treatment of raffinate leach solutions to convert ferrous sulfate to ferric sulfate through a biooxidative conversion process. As is well known in the art, raffinate is an acid leach solution which has been selectively stripped of its metal sulfate content, and is hence a barren solution. Raffinate is obtained, for example, as a result of solvent extraction processing of acidic copper and iron-rich leach solutions. In copper leaching operations, ferrous sulfate is produced through the reduction of ferric sulfate by copper compounds. In accordance with the subject invention, the ferrous sulfate can be rejuvenated to ferric-enriched sulfate by passing the raffinate solution through a column loaded with bio-catalysts and inoculated with fungi and iron-oxidizing bacteria.

One embodiment of the apparatus of the subject invention can be described by reference to FIG. 1. The specific embodiment illustrated includes a column 1 through which the raffinate is sprayed from emitters 2 onto the top of the column loaded with substrate, e.g., "BIOBALLS" which have been inoculated with fungi and iron-oxidizing bacteria. The column also comprises a porous or apertured rack as a support for the substrate material used in the column bed and which allows air and converted raffinate to flow therethrough. The converted, biooxidized ferric solution is collected in a reservoir (the "off" solution reservoir 5) while fresh, previously untreated raffinate is pumped from the "on" solution reservoir to the emitters by a sump pump 6. "On" and "Off" solutions are circulated and stored as diagrammed. In a preferred embodiment, the microorganisms are acidophilic fungi and bacteria. In addition, the bacteria are iron-oxidizing bacteria. The system of the subject invention is termed a Biooxidation Raffinate Converter (BRC).

The chemical reactions which occur when ferric sulfate solutions are contacted with copper minerals are shown by Equations (1) and (2) below. Reactions which occur within the BRC are shown as Equations (3) and (4).

Copper Leach Reactions
Copper Solubilization

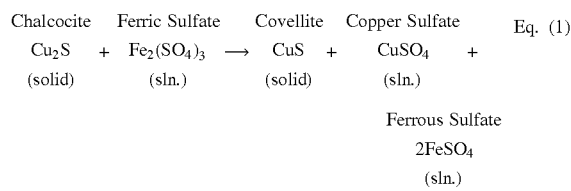

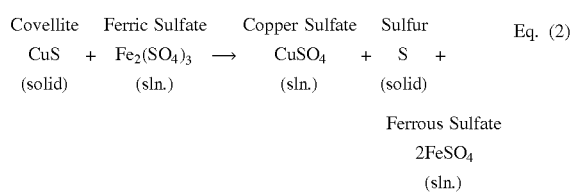

BRC-Conversion

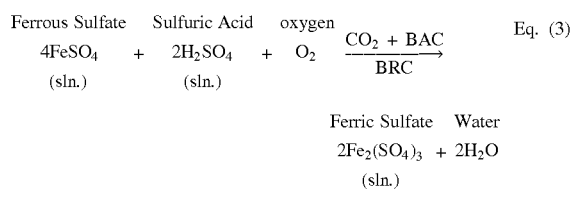

The above equations illustrate how chemical ferric sulfate leaching solubilizes copper to produce ferrous rich solutions and how the BRC can be used to convert ferrous sulfate to ferric sulfate and sulfuric acid.

In a preferred embodiment, the BRC comprises the following components(see FIG. 1):

(1) A column 1 through which the raffinate is passed; and
(2) A trickle filter array comprising
   (a) pre-treated (e.g., paraffin-coated) approximately one-inch diameter "BIOBALLS" 3, numbering about 650 or about 2.89 gallons by volume, representing about 60.85 square feet of surface area per 1.5 linear feet of column;
   (b) fungal inoculum, where the metabolic activity of the fungus provides $CO_2$, as well as additional surface area; and
   (c) robust iron-oxidizing bacterial inoculum.

More specifically, a column 1 through which the raffinate is sprayed through at least one emitter (shown in the diagram as a pair of emitters 2) to gravity flow through a load of pre-treated "BIOBALLS" 3 which have been inoculated with fungi and iron-oxidizing bacteria.

In a specific embodiment, the "BIOBALLS" can be supported in the column by a stainless steel rack 4 through which air is allowed to flow upward and converted raffinate downward.

The converted, biooxidized ferric solution is collected in the reservoir 5 while fresh raffinate is pumped to the emitters 2 by the sump pump 6.

The process of the subject invention can readily be modified by those skilled in the art having the benefit of the instant disclosure, taking into account the nutrient composition, pH, and toxicity of the raffinate. The addition of nutrients and supplements is for the purpose of maintaining a viable culture of iron-oxidizing bacteria. A person skilled in the art having the benefit of the current disclosure can readily make adjustments to accomplish this purpose. Nutrient sources such as those described in U.S. Pat. No. 5,413,624, which is hereby incorporated by reference, can be used. Specifically disclosed in U.S. Pat. No. 5,413,624 is PEGM, which supplies vitamins to support the growth and maintenance of the iron-oxidizing bacteria.

The growth medium PEGM, described in U.S. Pat. No. 5,413,624, provides nutrients for support and growth of yeast which, in turn, contributes metabolically generated vitamins for the iron-oxidizing bacteria. Use of the PEGM supplement provides high kinetic efficiencies. The PEGM based products "WPX100" or "PX100" (available from MBX Systems, Inc., Tucson, Ariz.) are introduced into the system in amounts ranging from about 1.5 to about 5% in volume.

PEGM supplements to the raffinate are not required, but can be preferable in order to achieve and maintain a healthy and robust inoculum within the BRC column. Typical concentrations of supplements range from about 1% to about 5% by volume.

Figure 3:
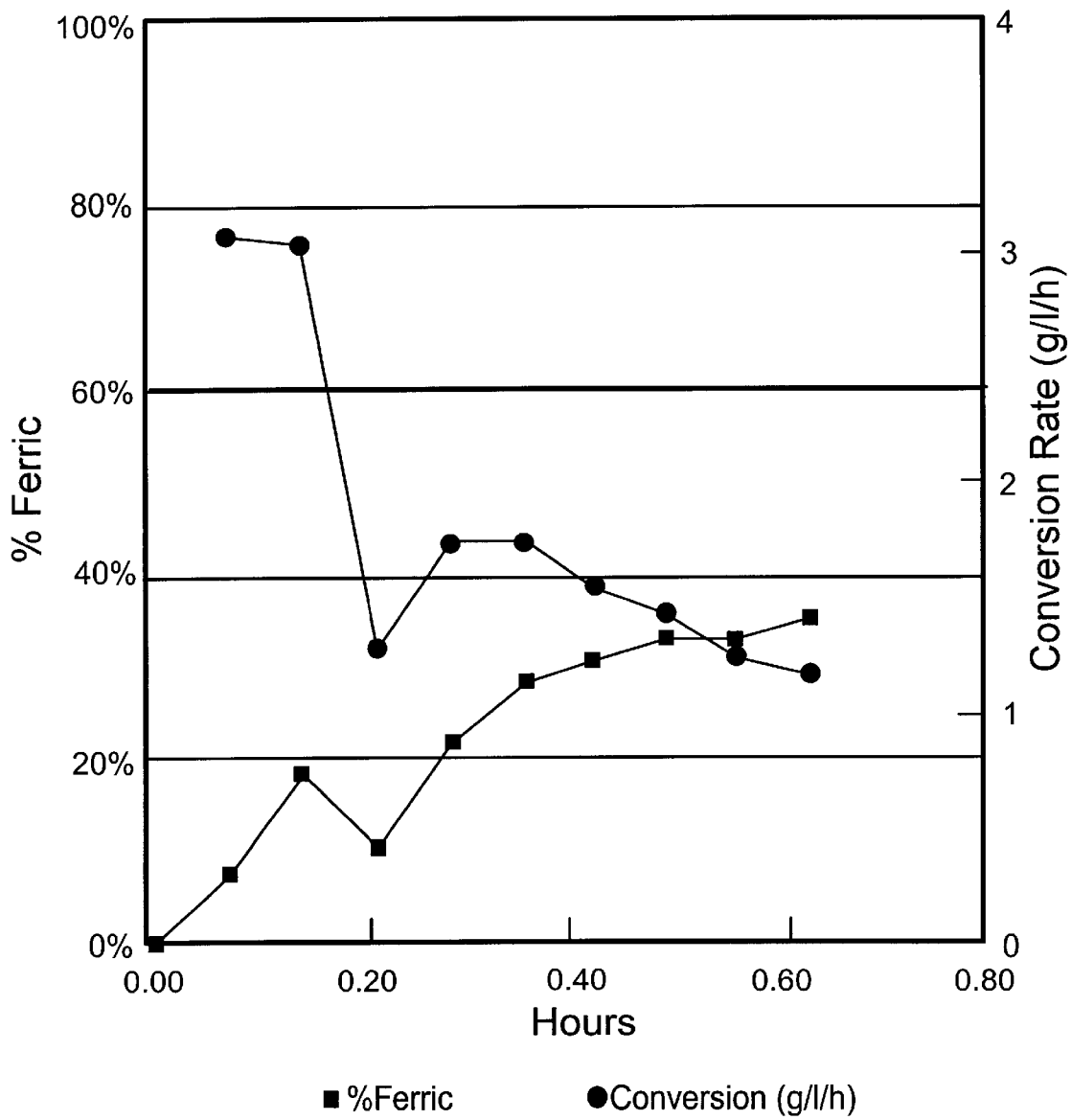
FIG. 3 shows the diagram of the results of a raffinate conversion using the subject system.

Chemical supplementation of the raffinate can be provided based on deficiencies in: ammonia, potassium, phosphate, magnesium and nitrogen. The supplemental source of these bacterial nutrients can be:

Ammonia: $(NH_4)_2SO_4$—Ammonium sulfate
Potassium: $K_2SO_4$—Potassium sulfate
Phosphate: $K_2HPO_4$—Dipotassium hydrogen phosphate
Magnesium: $MgSO_4 \cdot 7H_2O$—Magnesium sulfate heptahydrate
Nitrogen: $CaNO_3$—Calcium nitrate Adjustment of pH, if required, can be made by the addition of an acid, e.g., sulfuric acid, or a base, e.g, sodium bicarbonate. An operative pH range is about 1.3 to about 3.5, with an optimal pH range of about 1.8 to 2.5. Most raffinates have a pH of less than 3.5 and above 1.3. For biooxidative conversions of ferrous iron in raffinate solutions, the pH typically drops by about 0.1 units (FIGS. 2 and 3). The pH reduction can result from sulfur biooxidation to sulfuric acid as illustrated in Equation (4).

Toxicity testing on the raffinate should include determination of compounds potentially toxic to the microorganisms involved in the raffinate bioconversion. In certain cases, entrained organic diluent (kerosene) from inefficient solvent extraction processing can be present as a toxic substance. Metal toxicity can also result in damage to the inoculum in the BRC column. Dissolved metals such as aluminum, arsenic, mercury, molybdenum, and silver can be toxic to the iron-oxidizing bacteria used in the column system. Anions such as chlorine (Cl) can also be toxic if present in concentrations of greater than about 5 g/l.

To convert raffinate in the presence of levels of toxic substances that cannot be reduced or eliminated, metal-tolerant or chloride-tolerant inoculum and/or metal-adsorbent column substrate media can be utilized.

Once the growth medium, pH, toxicity, and nutrient operative parameters have been adjusted, the raffinate can be circulated through the BRC. Flow rates up to about 1 liter per minute, through a 24-inch column, can provide sufficient contact time to efficiently oxidize the circulating ferrous iron-rich raffinate.

During the operation of the BRC, air can be injected into the raffinate reservoirs to supply oxygen, if required. Carbon dioxide ($CO_2$) is metabolically generated by the fungi, providing the carbon source for the bacteria. If desired, air or oxygen can be injected into the raffinate reservoir, or column, through sparging tubes at rates of about 0.1 to about 2.0 liters/minute. The raffinate reservoir is preferably maintained at temperatures ranging from about 20° C. to about 35° C. Varying the temperature, as well as the air and $CO_2$ injection rates, simulates field conditions and tests operating efficiencies (see FIGS. 2 and 3).

The BRC can be constructed of a variety of materials, for example, glass, plastic, metal, and the like. Scale-up of the laboratory operation can be done readily by a person skilled in the art by following the operating parameters disclosed above.

The diameter of the column can be about ten times the BioBall packing diameter to reduce channelling of raffinate through the packing bed or along the column wall. The performance of the BRC can also be optimized by segmenting the column into stages that are approximately one column diameter in depth and by venting the column between stages to allow entrainment of air into the raffinate and natural convection of air through the packing bed. With this embodiment, it has been possible to convert ferrous to ferric in commercial raffinate to near completion (95%), and to demonstrate long term operation (60 days) at steady state conversion.

Figure 4:
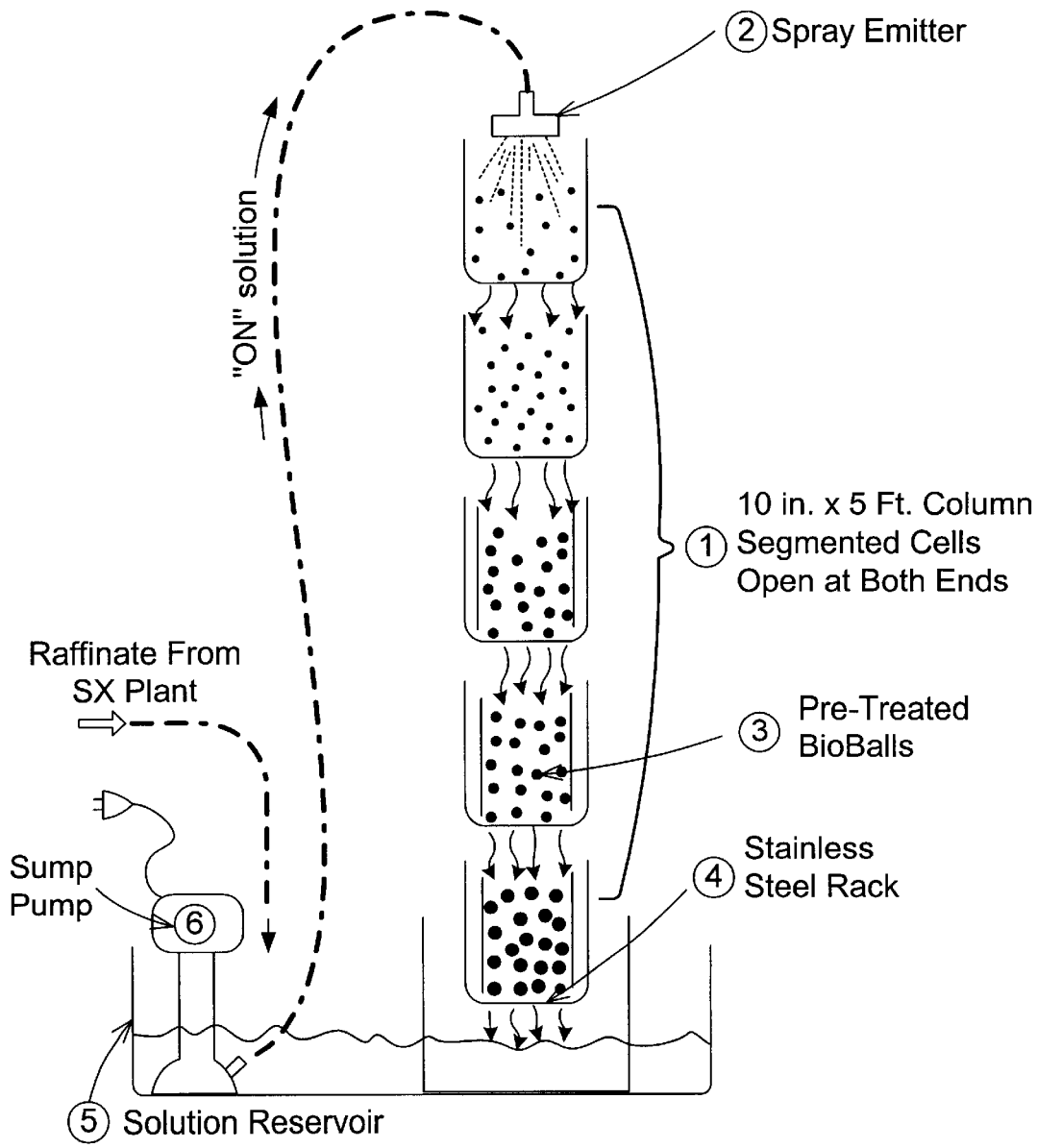
FIG. 4 shows a multistage biological raffinate converter.
Figure 5:
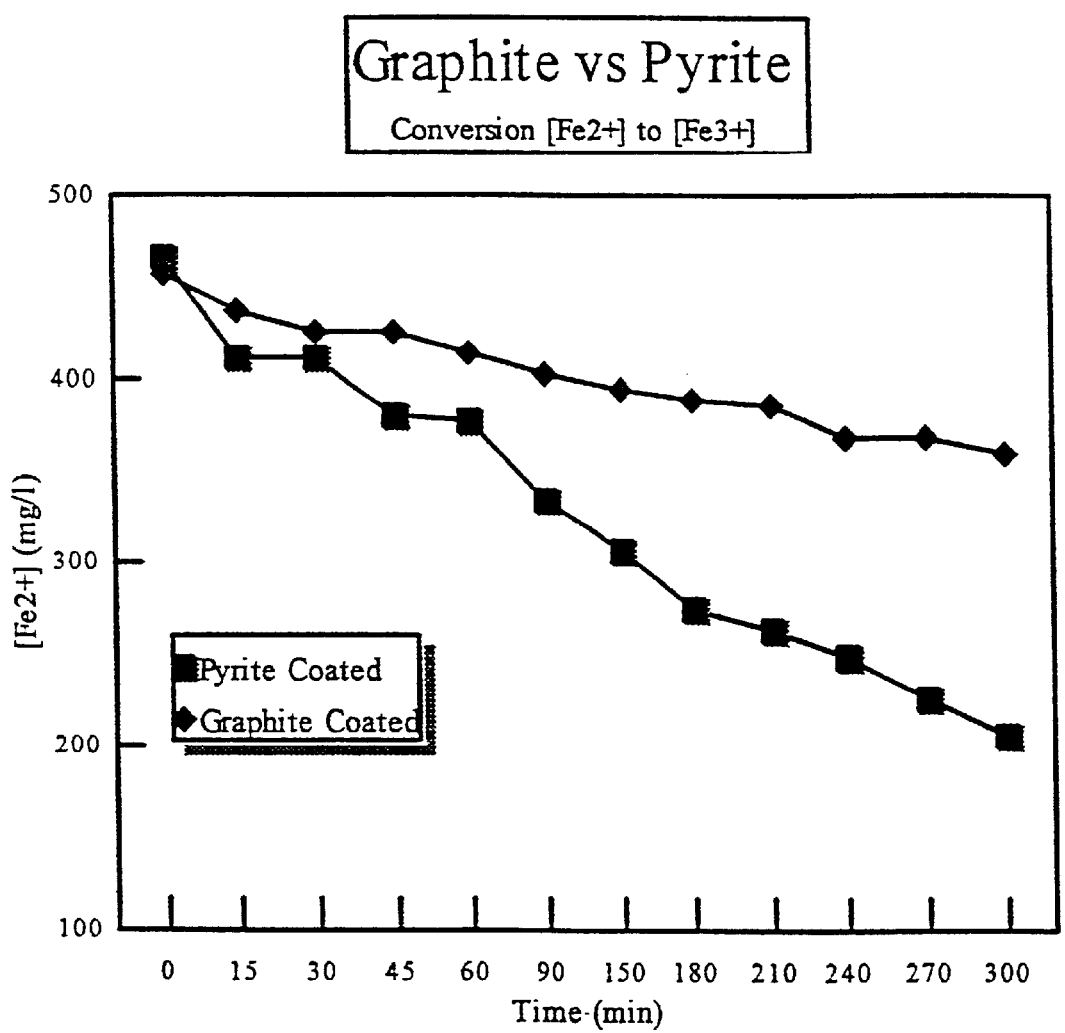
FIG. 5 shows a comparison of pyrite and graphite coatings of "BIOBALLS" for the conversion of ferrous to ferric ion in raffinate.

Preferred embodiments of the multistage BRC are depicted in FIGS. 4 and 5. In the preferred embodiment, the BRC comprises the following components:

(a) a segmented column 1 that is vented between stages through which raffinate is passed;

(b) a high surface area packing contained in the column stages which provide surface area for attachment of bacteria;

(c) coating of pyrite growth substrate onto media.

Coating of substrates onto "BIOBALLS" was investigated to further improve performance. *Thiobacillus ferroxidants* bacteria preferentially attach to iron minerals over bare polyethylene "BIOBALLS" or graphite coated "BIOBALLS", and hence higher reaction rates can be obtained from substrate coated balls over plain balls. A comparative study of graphite coated "BIOBALLS" vs. pyrite coated "BIOBALLS" has been conducted. "BIOBALLS" were coated using a slurry of the solid in acetone and polyethylmethacrylate (PEMA). The reaction rates were approximately double for the pyrite vs. the graphite reactor. See FIG. 5. A conversion study using a single stage reactor containing uninoculated balls was conducted as a control. No conversion of ferrous to ferric in raffinate solution was observed in the control in a three hour test.

Following are examples which illustrate procedures for practicing the invention. These examples should not be construed as limiting. All percentages are by weight and all solvent mixture proportions are by volume unless otherwise noted.

EXAMPLE 1

Laboratory BRC Setup

A laboratory-scale BRC was built and tested. Components of the laboratory scale BRC are as follows:

(1) A column approximately six inches in diameter and 24 inches high, having a three-liter capacity reservoir. The column is open at both ends, with a stainless steel rack at one end, the bottom end, and spray emitters at the top. The column reservoir holds about 650 one-inch diameter "BIOBALLS". Prior to loading the column, the "BIOBALLS" were inoculated with an acidophilic fungi. The fungal-inoculated "BIOBALLS" are then loaded into the column and treated with 2 liters of circulating growth medium inoculated with iron-oxidizing bacteria. The growth medium solution is continuously circulated through the column until placed into operation.

(2) The 3-liter reservoir serves initially as an inoculum tank during column loading. Once the column is placed into operation, the column reservoir serves as a high ferrous content raffinate reserve tank. The column "Off" solution (termed as such because it comes "off" the column), or converted high ferric content raffinate, is discharged from the system and sent to the site of application. The reserve tank is equipped with a sump pump which moves the reservoir solution to the top of the column to be discharged through the emitters.

EXAMPLE 2

Operation of the BRC

The BRC of the subject invention can be operated according to the following protocol:

(1) As described in Example 1 and as shown in FIG. 1, one embodiment of the BRC is comprised of the trickle filter column (1), a solution reservoir (5), and a solution pumping device (6), which circulates solutions through the system.

(2) Media used to pack the columns, i.e., used as the column "bed," can be selected by a person skilled in the art having the benefit of the subject disclosure. For example, it is preferred to use a solid medium which can serve as a support for the fungal or bacterial cultures employed in the system of the subject invention. An acceptable solid support medium can be selected from the group consisting of acrylic beads, coarse activated charcoal, chemically inert ceramic chips, pumice chips, and plastic "BIOBALLS". Once selected, the volume of media substrate (pre-treated "BIOBALLS") inoculated with fungi is placed into the BRC column. The solution reservoir is loaded with growth medium and the iron-oxidizing bacteria inoculum of choice. Iron-oxidizing bacteria are well known in the art. See Johnson et al., supra. The inoculum plus growth medium solutions are pumped counter current through the BRC for 1 to 5 days. The determination of when the media substrate is sufficiently loaded is based on bacterial cell counts. A loading density of $10^6$ cells per $cm^3$ can be determined by most probable number standard method of bacterial enumeration. Once sufficient cell density is attained, the media substrate is regarded as adequately loaded to start passing ferrous-rich raffinate. Upon completion of the media substrate loading, the growth medium solution is removed from the BRC and reservoir and discarded.

(3) Upon completion of the inoculation of the BRC, a continuous flow of raffinate can be added to the reservoir.

EXAMPLE 3
Study With Mine Raffinate

Long term testing of the BRC has been conducted. A four stage BRC column as depicted in FIG. 4 was set up at a solvent extraction plant. The column was 10" in diameter and was loaded with mixed bare and graphite/paraffin coated 1" "BIOBALLS". Batch tests were conducted in which a specific quantity of raffinate was added to the reservoir. Batch tests were conducted at the start of the test period and intermittently on 1–2 week intervals. The raffinate was recycled from the reservoir through the column and the ferrous concentration was measured as a function of time. Ferrous concentrations were measured using the phenanthroline test procedure. L. Clesceri, A. Greenberg, "Methods for the Examination of Water and Wastewater" (1989). Reaction rates were determined using the equations below. The first backward difference to calculate the rate.

$r = dC/dt$ (g/l min)

$R = V \, dC/dt$ (g/min)

$R_{ball} = R/(\# \text{ of balls})$ (g/ball min)

where

V = volume of raffinate in reactor (l)

C = ferrous concentration (g/l)

t = time (min)

The column was left in continuous mode between batch tests. In continuous mode a constant feed of fresh raffinate is supplied to the reseviour and converted raffinate overflows from the reseviour at the same rate. The recycle rate through the column is much higher than the feed rate. Therefore, the contents of the reactor are assumed to be well mixed. Raffinate was fed to the reseviour with a syphone line from a raffinate tank. The feed rate was set at a constant value which adjusted occasionally to effect ferrous concentration in the raffinate stream for rate studies. After every one to two weeks of steady rate operation, the continuous operation was interrupted for batch testing to further assess performance. The rate equation for the continuous reactor is given below.

$R = v \, (C_i - C_o)$ (g/min)

$R_{ball} = R/(\# \text{ of balls})$ (g/ball min)

where v = feed rate of raffinate (l/min)

$C_i$ = ferrous concentration (g/l)

$C_o$ = ferrous concentration out (g/l)

Increased iron concentration in the off solution was observed in the first day of experiments. Inoculation of the column was performed using a growth medium (Media 64) which contains about 4 g/l iron. The reactor was setup in continuous reactor mode overnight and by the second day total iron levels in the feed had dropped off to that of the input. Near complete conversion of ferrous to ferric was demonstrated in batch tests without pickup in iron on the second day. The experimental results are reported below.

TABLE 1

Recycle 4 l of raffinate until ferrous is mostly (>90%) converted to ferric. Recycle rate is 2 l/min

| Time (min) | [Fe2] (mg/l) | Rate (g/h) | Rate homo (g/l h) | RATE ball (mg/ball h) |
|---|---|---|---|---|
| 0 | 110.6 | | | |
| 15 | 78.4 | 0.52 | 0.16 | 0.15153 |
| 30 | 66.6 | 0.19 | 0.06 | 0.05553 |
| 45 | 54.8 | 0.19 | 0.06 | 0.05553 |
| 60 | 4.0 | 0.20 | 0.06 | 0.06024 |
| 75 | 32.2 | 0.16 | 0.05 | 0.04612 |

TABLE 2

Recycle 5 l of raffinate until ferrous is mostly (90%) converted to ferric. Recycle rate is 4 l/min

| Time (min) | [Fe2] (mg/l) | Rate (g/h) | Rate homo (g/l h) | RATE ball (mg/ball h) |
|---|---|---|---|---|
| 0 | 113.0 | | | |
| 15 | 76.2 | 0.74 | 0.15 | 0.21647 |
| 30 | 64.6 | 0.23 | 0.05 | 0.06824 |
| 45 | 52.1 | 0.25 | 0.05 | 0.07353 |
| 60 | 39.7 | 0.25 | 0.05 | 0.07294 |
| 75 | 34.6 | 0.10 | 0.02 | 0.03000 |

TABLE 3

Recycle 5 l until complete conversion Recycle rate is 4 l/min

| Time (min) | [Fe2] (mg/l) | Rate (g/h) | Rate homo (g/l h) | RATE ball (mg/ball h) |
|---|---|---|---|---|
| 0 | 49.5 | | | |
| 5 | 32.5 | 1.02 | 0.20 | 0.30000 |
| 10 | 29.2 | 0.20 | 0.04 | 0.05824 |
| 15 | 26.0 | 0.19 | 0.04 | 0.05647 |
| 30 | 17.1 | 0.18 | 0.04 | 0.05235 |

TABLE 4

Recycle 5 l until complete conversion Recycle rate is 4 l/min

| Time (min) | [Fe2] (mg/l) | Rate (g/h) | Rate homo (g/l h) | RATE ball (mg/ball h) |
|---|---|---|---|---|
| 0 | 44.1 | | | |
| 5 | 36.3 | 0.47 | 0.09 | 0.13765 |
| 10 | 27.6 | 0.29 | 0.10 | 0.15353 |
| 15 | 22.7 | 0.29 | 0.06 | 0.08647 |
| 30 | 13.2 | 0.19 | 0.04 | 0.05588 |

TABLE 5

Recycle 5 l until complete conversion Two cooler pumps: estimated 4 l/min recycle

| Time (min) | [Fe2] (mg/l) | Rate (g/h) | Rate (g/l h) | RATE ball (mg/ball h) |
|---|---|---|---|---|
| 0 | 36.1 | | | |
| 5 | 31.6 | 0.27 | 0.05 | 0.07941 |
| 10 | 28.3 | 0.20 | 0.04 | 0.05824 |
| 15 | 24.7 | 02.22 | 0.04 | 0.06353 |
| 20 | 22.9 | 0.11 | 0.02 | 0.03176 |
| 25 | 22.1 | 0.05 | 0.01 | 0.01412 |

TABLE 5-continued

Recycle 5 l until complete conversion
Two cooler pumps: estimated 4 l/min recycle

| Time (min) | [Fe2] (mg/l) | Rate (g/h) | Rate (g/l h) | RATE ball (mg/ball h) |
|---|---|---|---|---|
| 30 | 19.3 | 0.17 | 0.03 | 0.04941 |
| 45 | 18.5 | 0.02 | 0.00 | 0.00471 |
| 60 | 19.1 | −0.01 | −0.00 | −0.00353 |
| 75 | 19.5 | −0.01 | −0.00 | −0.00235 |

TABLE 6

Continuous reactor data

| Date | Flow Rate | [Fe2]$_{in}$ (mg/l) | [Fe2]$_{out}$ (mg/l) | [Fe]$_{total}$ (g/l) | Rate (g/h) | Rate$_{ball}$ (mg/ball h) |
|---|---|---|---|---|---|---|
| 10/15/96 | 3 | 70 | 23 | 460/480 | 0.14 | 0.041 |
| 10/16/96 | 3 | 74 | 65 | 400/400 | 0.03 | 0.008 |
| 10/17/96 | 3 | 39 | 11 | 410/480 | 0.08 | 0.025 |
| 10/18/96 | 3 | 166 | 30 | 440/520 | 0.41 | 0.121 |
| 10/25/96 | feed off | 111 | 21 | | | |
| 11/06/96 | 9 | 44 | 24 | | 0.17 | 0.05 |
| 11/06/96 | 56 | 44 | 36 | | 0.42 | 0.124 |
| 11/15/96 | recy. off | 45 | 43 | | | |
| 11/21/96 | 45 | 36 | 28 | | 0.38 | 0.111 |

EXAMPLE 4

Pyrite Substrate on 1" Diameter "BIOBALLS"

A comparative study of pyrite and graphite substrates coated onto "BIOBALLS" was performed. Coatings were applied in the following manner. The solids were ball milled for 4 hours with PEMA solution at a ratio of 1:1 by volume (solids to polymer). The binder formulation was comprised of polyethylene dissolved in acetone at a ratio of 1:4 by volume. Three batches of each solid each containing 250 ml binder were prepared. The graphite and pyrite slurries were poured into buckets and hand mixed with "BIOBALLS". Approximately 800 "BIOBALLS" were coated with each formulation. The coated "BIOBALLS" were dried on a screen for approximately 48 hours. The coated "BIOBALLS" were inoculated with *Thiobacillus ferroxidants* bacteria in Media 64 over a 72 hour period. The "BIOBALLS" were submerged in the media, placed under a shaker table and maintained at 30° C.

The inoculated "BIOBALLS" were loaded into the compartment of a single stage BRC. Four liters of synthetic raffinate solution containing 4 g/l Fe was recycled from a reservoir through the column at a rate of 2 l/min. The ferrous concentration was measured as a function of time. The pyrite coated "BIOBALLS" resulted in approximately twice the conversion rate of the graphite coated "BIOBALLS". The experimental results are reported below. The results are compared in FIG. 5.

An experiment was conducted to determine the efficiency of the BRC column for the conversion of ferrous to ferric with bare "BIOBALLS" and without inoculation. A single stage BRC was loaded with approximately 800 "BIOBALLS". Four liters of commercial raffinate was recycled at a rate of 2 l/min through the column. No conversion of ferrous to ferric was observed. The experimental results are reported below.

TABLE 7

Single stage pyrite coated "BIOBALLS"
Volume: 4 l of synthetic raffinate
Recycle rate of 2 l/min

| Time (min) | [Fe2] (mg/l) | Rate (g/h) | Rate homo (g/l h) | RATE ball (mg/ball h) |
|---|---|---|---|---|
| 0 | 465.5 | | | |
| 15 | 413.2 | 0.84 | 0.21 | 1.046 |
| 30 | 410.8 | 0.04 | 0.01 | 0.0048 |
| 45 | 380.7 | 0.48 | 0.12 | 0.602 |
| 60 | 378.5 | 0.04 | 0.01 | 0.044 |
| 90 | 334.0 | 0.36 | 0.09 | 0.445 |
| 150 | 305.5 | 0.11 | 0.03 | 0.143 |
| 180 | 275.4 | 0.24 | 0.06 | 0.301 |
| 210 | 264.2 | 0.09 | 0.02 | 0.112 |
| 240 | 247.7 | 0.13 | 0.03 | 0.165 |
| 270 | 226.4 | 0.17 | 0.04 | 0.213 |
| 300 | 205.8 | 0.16 | 0.04 | 0.206 |

TABLE 8

Single stage graphite coated "BIOBALLS"
Volume: 4 l of synthetic raffinate
Recycle rate of 2 l/min

| Time (min) | [Fe2] (mg/l) | Rate (g/h) | Rate homo (g/l h) | RATE ball (mg/ball h) |
|---|---|---|---|---|
| 0 | 457.7 | | | |
| 15 | 437.5 | 0.32 | 0.08 | 0.404 |
| 30 | 425.2 | 0.20 | 0.05 | 0.246 |
| 45 | 425.2 | 0.00 | 0.00 | 0.000 |
| 60 | 415.6 | 0.15 | 0.04 | 0.192 |
| 90 | 402.6 | 0.10 | 0.03 | 0.130 |
| 150 | 394.4 | 0.03 | 0.01 | 0.041 |
| 180 | 388.7 | 0.05 | 0.01 | 0.057 |
| 210 | 387.5 | 0.01 | 0.00 | 0.012 |
| 240 | 369.5 | 0.14 | 0.04 | 0.180 |
| 270 | 368.4 | 0.01 | 0.00 | 0.011 |
| 300 | 360.7 | 0.06 | 0.02 | 0.077 |

TABLE 9

Bare uninoculated "BIOBALLS"
4 l of raffinate recycled through single stage reactor.
~800 "BIOBALLS" Recycle rate: 2 l/min

| Time (min) | [Fe2] (mg/l) | Rate (g/h) | Rate homo (g l/h) | RATE ball (mg/ball h) |
|---|---|---|---|---|
| 0 | 46.3 | | | |
| 15 | 47.1 | −0.02 | −0.00 | −0.00471 |
| 30 | 47.1 | 0.00 | 0.00 | 0.0000 |
| 45 | 47.9 | −0.02 | −0.00 | −0.00471 |
| 60 | 47.9 | 0.00 | 0.00 | 0.0000 |
| 120 | 47.9 | | | |

It should be understood that the above description is for illustrative purposes only and that various modifications or changes in light thereof will be suggested to persons skilled in the art and are to be included within the spirit and purview of this application disclosure and the scope of the appended claims.

What is claimed is:

1. A system for the biological oxidation of a metal cation wherein said system comprises a reactor cell having a first opening to receive a sample containing said metal cation and a second opening through which said sample may exit, and wherein said reactor cell contains a packing material wherein said packing material comprises a coating which is colonized with oxidizing bacteria, and wherein said packing material comprises ring and pin configuration polyethylene balls.

2. The system, according to claim 1, wherein said packing material is disposed within said reactor cell on a support which is permeable to said sample such that said sample may pass through said support and out said exit after exposure to the colonized packing material.

3. The system, according to claim 1, wherein said coating is selected from the group consisting of sulfide concentrates and graphite.

4. The system, according to claim 3, wherein the sulfide concentrate is pyrite.

5. The system, according to claim 1, wherein said coating is attached to said packing material with a bonding agent selected from the group consisting of polyethylmethacrylate and paraffin.

6. The system, according to claim 1, wherein said packing material is further colonized by acidophilic fungi.

7. The system, according to claim 1, wherein said oxidizing bacteria are Thiobacillus.

8. The system, according to claim 1, which comprises multiple reactor cells connected in series.

9. The system, according to claim 8, comprising venting between said reactor cells.

10. A method for oxidizing a metal cation wherein said method comprises biological oxidation of the cations by oxidizing bacteria wherein the cations are contacted with said bacteria in a system which comprises a reactor cell having a first opening to receive a sample containing said metal cation and a second opening through which said sample may exit and wherein said reactor cell contains a packing material wherein said packing material comprises a graphite coating which is colonized with oxidizing bacteria.

11. The method, according to claim 10, wherein said coating is attached to said packing material with a bonding agent selected from the group consisting of polyethylmethacrylate and paraffin.

12. The method, according to claim 10, wherein said packing material is further colonized by acidophilic fungi.

13. The method, according to claim 10, wherein said oxidizing bacteria are Thiobacillus.

14. The method, according to claim 10, wherein said system comprises multiple reactor cells connected in series.

15. The method, according to claim 10, wherein said metal cation is in a raffinate solution.

16. The method, according to claim 10, wherein said metal cation is iron.

* * * * *